Feb. 15, 1955
J. JAMES
2,702,118
FRUIT GRADER
Filed July 22, 1953
2 Sheets-Sheet 1
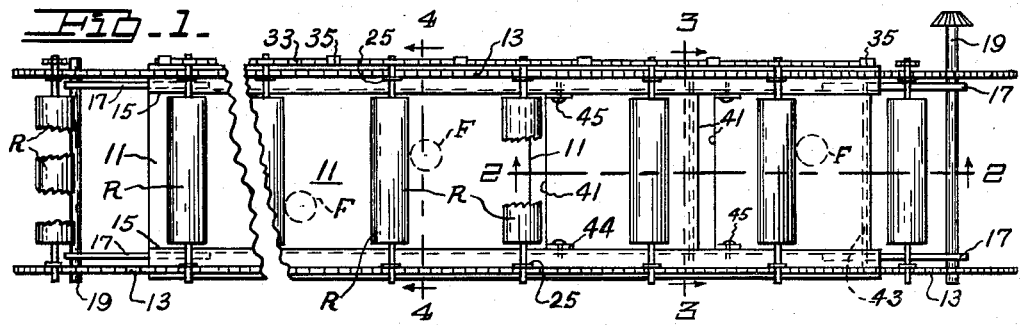
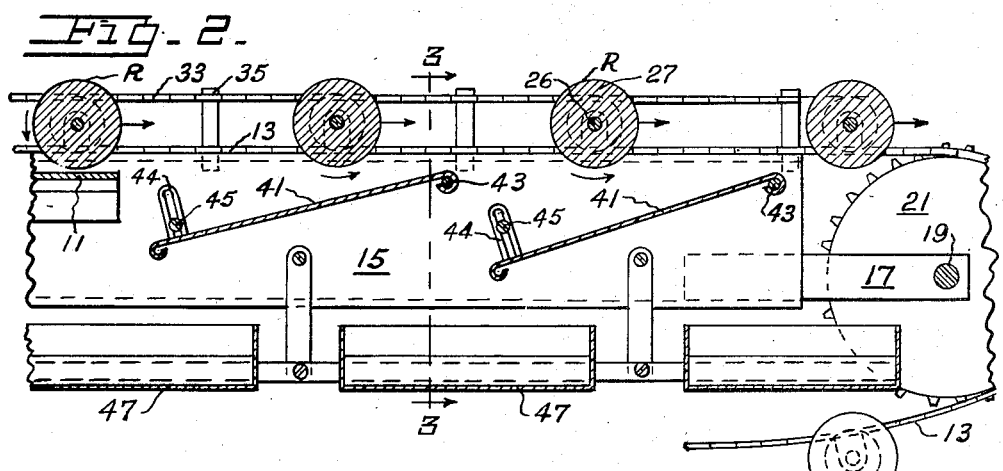
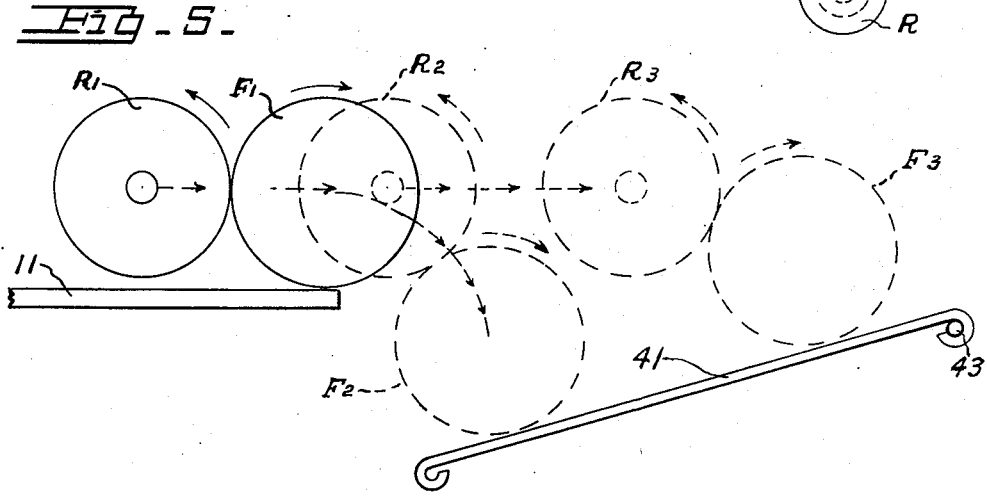
INVENTOR.
Jolly James
BY
His Attorney Feb. 15, 1955 J. JAMES 2,702,118
FRUIT GRADER
Filed July 22, 1953 2 Sheets-Sheet 2
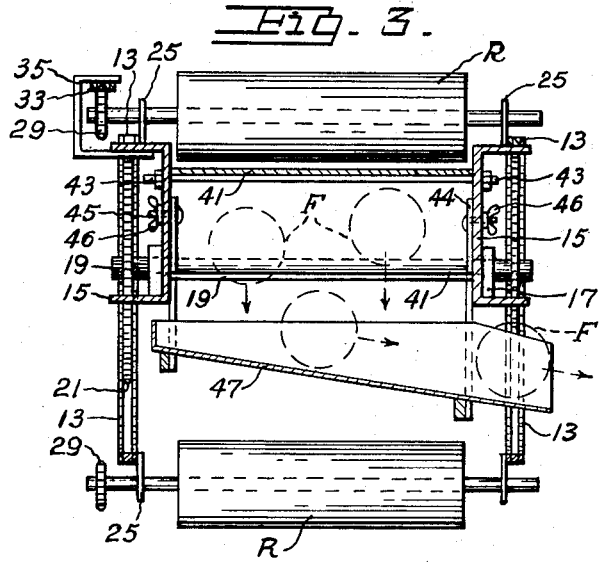
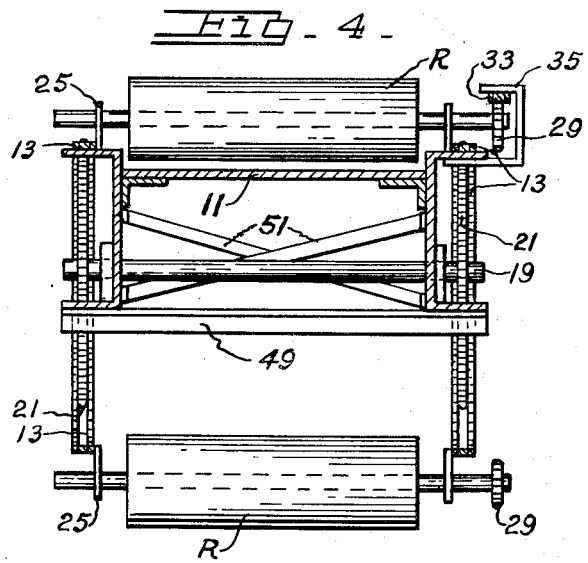
INVENTOR.
Jolly James
BY
His Attorney

United States Patent Office 2,702,118
Patented Feb. 15, 1955

2,702,118

FRUIT GRADER

Jolly James, Melvindale, Mich.

Application July 22, 1953, Serial No. 369,575

5 Claims. (Cl. 209—82)

The invention relates to apparatus for grading or sorting fruit, and more particularly to means for separating fruit selectively according to size.

It is an object of the invention to provide apparatus for grading fruit according to size and which will be of a simple reliable construction.

It is also an object of the invention to provide fruit separating means which is disposable to cooperate with a fruit conveyor which rolls the fruit freely along to avoid creating friction marks or bruises on the fruit.

It is a further object of the invention to provide fruit grader apparatus which will be conveniently adjustable to separate fruit of the desired size and which will not make bruises or friction marks upon the fruit as it passes through the apparatus.

Further objects and advantages are within the scope of the invention, such as relate to the arrangement, operation and function of the related elements of the structure, to various details of construction and to combinations of parts, elements per se, and to economies of manufacture and numerous other features, as will be apparent from a consideration of the specification in conjunction with the drawings disclosing specific embodiments of the invention, wherein similar reference characters are applied to corresponding parts throughout, and in which:

Fig. 1 is a plan view of a fruit grader and conveyor in accordance with my invention;

Fig. 2 is an enlarged longitudinal sectional view on line 2—2 of Fig. 1;

Fig. 3 is an enlarged cross-sectional view on line 3—3 on Fig. 1;

Fig. 4 is a cross-sectional view on line 4—4 on Fig. 1; and

Fig. 5 is an enlarged diagrammatic view illustrating the operation of one of the fruit grading devices.

Referring more specifically to the views of the drawings where I have illustratively disclosed an embodiment of my invention, it will be seen that I provide a fruit conveyor table 11 presenting an elongated horizontally disposed surface whereupon the fruit F is rolled along from the front end to the rear end by transversely disposed fruit moving members R, the latter being carried on and moved along by endless flexible members such as a pair of machine chains 13.

The apparatus embodies structural support members such as the two elongated side pieces or channels 15 wherebetween the conveyor table is secured and supported. On the ends of the two side pieces 15 bearing brackets 17 are provided to rotatively support shafts 19 which carry and drive chain wheels 21 over which the two chains 13 pass. The upper straight runs of the chains pass along opposite sides of the table 11, upon the upper surfaces of the side pieces 23 on which the chains slide along being thereby held accurately at a predetermined level. This also serves to exclude the rolling fruit from contact with the chains.

The fruit moving members R extend transversely across over and rather close to the table surface, as shown, being supported from the chains by means of brackets 25 which rise therefrom, in a chain attachment arrangement available on the market. As may be seen in Fig. 2, each of these fruit moving members R preferably comprises a shaft 26 having a thick covering 27 of soft rubber-like material.

While certain kinds of fruit or vegetable products may be moved by the transverse fruit moving members R being simple cross-pieces passing along non-rotatively, it is very important when handling most kinds of delicate high grade fruit to provide these fruit moving members in the form of rollers which are driven to turn reversely to their direction of travel while being carried along over the conveyor table. This is accomplished by providing a sprocket chain wheel 29 on one end of each roller shaft 26 and a stationary piece of chain 33 is supported by stationary brackets 35 in a position to mesh with the sprocket wheels 29. As the rollers are carried along over the table from front end to the rear end, the stationary chain 33 positively drives the fruit moving rollers R causing these to turn in a direction which is the reverse of the direction in which the fruit F rolls on the table. And by thus turning reversely, these fruit moving rollers R cause the fruit F to roll along freely thereby avoiding the creation of scratches, friction marks, bruises and other down grading marks on the fruit.

The rear portion of the conveyor table 11 is provided with a plurality of fruit grading means over which the fruit is caused to roll freely by the reversely turning rollers. Each of these fruit grader devices comprises an inclined fruit receiving surface or panel 41, such as a piece of sheet metal, supported with its front portion at a level below the fruit moving rollers by an amount equal to the diameter of fruit which is to be separated at each grader. The rear end of each inclined grader panel is supported pivotally upon a rod 43 extended across the side pieces 15. The front end of each panel 41 has upturned lugs 43 each of which is slotted to receive a supporting screw 45 passed through the adjacent side piece and secured by a thumb screw nut 46 for convenient adjustment of the level of the front end of the inclined panel. The panel 41 of the frontmost grader is adjusted to remove all the fruit smaller than a predetermined size. Each successive grader, of which there may be any desired number in the sequence, is then set to successively remove the fruit which is within each progressively larger grade, as the fruit passes along. The fruit engaging surfaces of the conveyor table and also of the inclined grader panels are preferably coated with a yieldable coating of rubber, or the like, for the protection of the fruit, and when constructed of sheet metal, the exposed edges are preferably beaded or rounded, as a further precaution.

In operation, as Fig. 5 shows, a piece of fruit F which has been rolled along on the top of the table 11, from the front end to the rear end thereof, by the reversely turning roller R. As shown, the fruit F approaches the rear edge of the table surface ahead of the roller. These positions of the roller and the fruit is represented by dotted circles R1 and F1, respectively. The fruit then drops down on the inclined plane 41 being given a backward impulse as it falls over the rear edge of the table 11 so that it strikes the inclined panel 41 approximately at the position designated as F2. During this time it is being approached by the roller R which arrives at a position substantially at R2, from which it will be seen that this piece of fruit is just large enough to be reengaged by the roller. The next position, designated as R3 and F3, shows the roller pushing the fruit up the incline 41 to pass the fruit over the rear edge of this panel to be tested for size in the next grader. A piece of fruit of slightly smaller size would have passed through this first grader, adjusted as shown.

The structural cross-piece 49 and the crossed pieces 51 serve to join the side pieces 15 in a rigid conveyor structure. Under the lower edge of each inclined grader panel 41, an individual chute 47 is provided to receive all the fruit from that particular grader and to guide it therefrom in segregated relation. Such troughs are inclined so that the fruit rolls by gravity to one side of the conveyor table to be packed for marketing and shipment. Various polishing and other fruit processing elements may be disposed along the conveyor table so that the fruit is cleaned and polished in good marketable condition by the time it reaches the graders at the rear end of the conveyor table, in the manner disclosed in my co-pending United States Patent Application Serial No. 199,684 filed December 7, 1950. Said application also shows the fruit conveyor table having the reversely rotated rollers moving thereover to roll fruit freely along on the table.

It is apparent that within the scope of the invention modifications and different arrangements may be made other than herein disclosed, and the present disclosure is illustrative merely, the invention comprehending variations thereof.

I claim as my invention:

1. A fruit grader and conveyor having in combination a fruit conveyor table of elongated shape, fruit moving means for rolling fruit along on said conveyor table toward the rear end thereof, the rear end of said fruit conveyor table being conformed to provide a plurality of fruit grading means disposed cooperatively with said fruit moving means so that the fruit is rolled along over the grading means to be separated in a plurality or different predetermined grade sizes, each of said fruit grading means comprising an inclined fruit receiving surface in alignment with the table surface and means supporting the inclined fruit receiving surface of each fruit grading means with its rearward end substantially level with said table and its frontward end disposed slightly to the rear of the rearmost end of the preceding fruit carrying surface and at a level which is lower than said fruit moving means by an amount equal to the predetermined diameter of fruit which is to be separated at each fruit grading means.

2. A fruit grader and conveyor in accordance with claim 1 and further characterized by said support means having a pivot shaft extending across under the rearward end of each inclined fruit receiving surface for pivotally supporting it about level with the fruit conveyor table surface, and convenient adjustable means supporting the frontward end of each inclined fruit receiving surface at a level which may be adjusted to a desired position below the fruit moving means to separate fruit of the desired diameter as said fruit moving means moves the fruit along the table to pass over the inclined fruit receiving surfaces.

3. A fruit grader comprising an elongated table surface, fruit moving members moving over said table surface for rolling fruit therealong from the front end toward the back end thereof, a plurality of frontwardly inclined fruit grading panels disposed in a series relation for having fruit passed successively thereover, and the front portions of said inclined panels being at different levels sufficiently below the fruit moving members passing thereover so that fruit of a predetermined size to be selected at each panel will be permitted to roll frontward by gravity under the fruit moving member and to be dropped from the front edge of each such inclined fruit grading panel.

4. A fruit grader in accordance with claim 3 and each of said fruit moving members being a rotatively carried roller disposed transversely of the long axis of said table surface, and means for turning said rollers to rotate in a reverse direction compared to the direction of rotation of the fruit rolling along upon the table surface.

5. In combination in fruit grading apparatus, a fruit conveyor table of elongated form, a pair of endless machine chains, chain wheels for running said chains along opposite sides of said table with the rearwardly moving runs of the chains disposed at a level above said table, rollers extending transversely over and across the table between the runs of the chains moving to the rearward end of the table for moving the fruit to roll along the table toward the rearward end thereof, roller rotating means for rotating said rollers to turn reversely relative to the direction of the fruit to cause the fruit to roll freely along as it is pushed toward the rear end of the table, driving means for driving said chain wheels in a definite synchronized relation, the rear portion of said fruit conveyor table being conformed to provide a plurality of series arranged fruit grading means cooperative with said rollers to have the fruit rolled along thereover for grading the fruit, each of said fruit grading means comprising an inclined fruit receiving panel, means supporting each inclined panel in cooperative alignment under the reversely turning rollers with the frontward edge of each inclined panel disposed slightly to the rear of the preceding fruit receiving panel and below the rollers by an amount equal to the diameter of fruit to be separated at each respective fruit grading means, and the rearward edge of each inclined surface being supported at a level for cooperation with the reversely turning rollers carried thereover, to pass the larger fruit further to the rear.

References Cited in the file of this patent

UNITED STATES PATENTS 2,063,008    Allen    Dec. 8, 1936